No. 656,813. Patented Aug. 28, 1900.
M. I. COHEN.
INSTANTANEOUS WATER HEATER.
(Application filed Jan. 17, 1900.)
(No Model.)
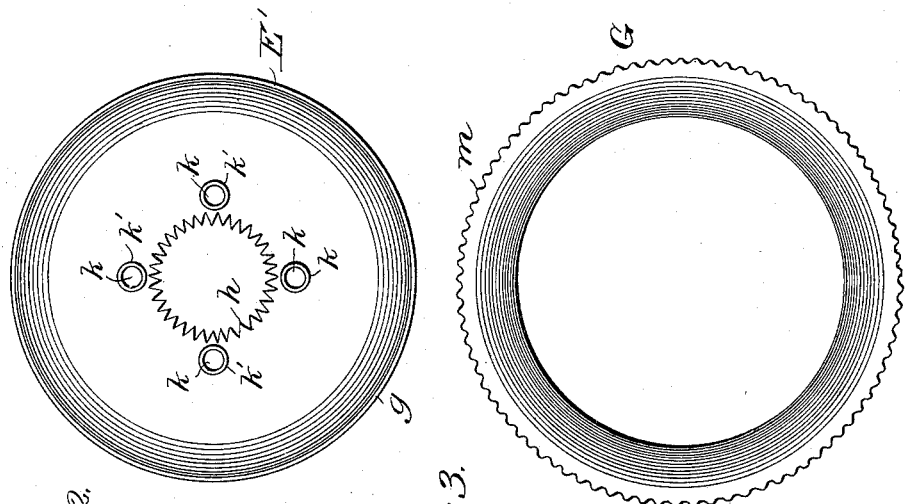
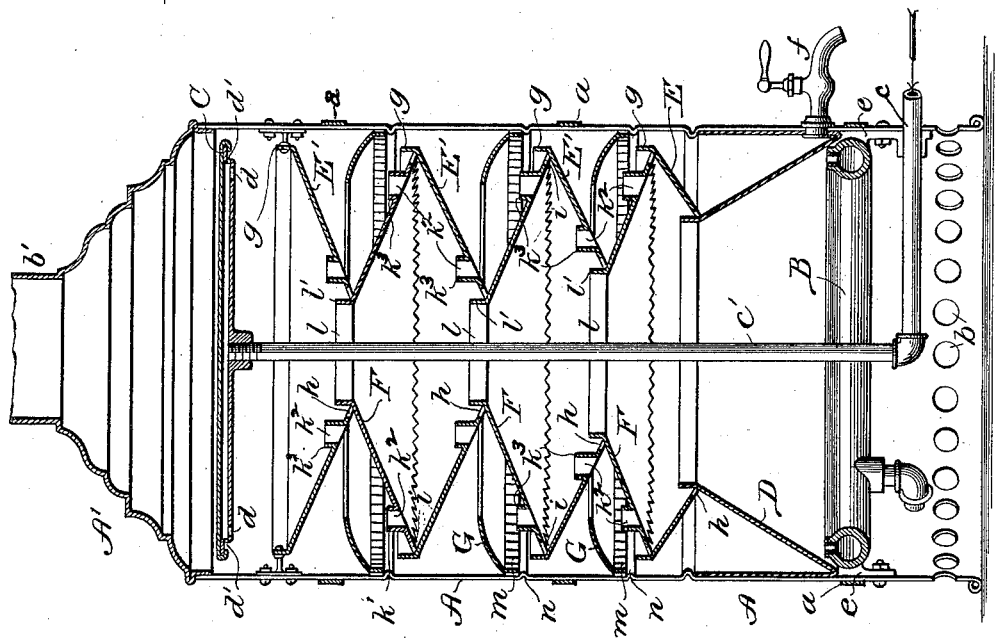
Witnesses:
Chas E Gaylord,
John Enders Jr.
Inventor:
Morris I. Cohen,
By Dyrenforth & Dyrenforth,
Attys.

UNITED STATES PATENT OFFICE.

MORRIS I. COHEN, OF CHICAGO, ILLINOIS.

INSTANTANEOUS WATER-HEATER.

SPECIFICATION forming part of Letters Patent No. 656,813, dated August 28, 1900.

Application filed January 17, 1900. Serial No. 1,814. (No model.)

*To all whom it may concern:*

Be it known that I, MORRIS I. COHEN, a citizen of the United States, residing at Chicago, in the county of Cook and State of Illinois, have invented a new and useful Improvement in Instantaneous Water-Heaters, of which the following is a specification.

The primary object of my improvement is to provide a novel construction of instantaneous water-heater which shall render it relatively simple and inexpensive to manufacture; and my object is also to provide the construction in a form which shall adapt most of the parts to be nested for compactness in shipment, thus to save in cost of transportation, and which shall enable the parts to be easily adjusted together to form the heater.

Referring to the accompanying drawings, Figure 1 is a vertical section of my improved instantaneous water-heater, taken through the casing at the line of junction of the portions thereof; Fig. 2, a plan view of one of the upwardly-flaring sheet-metal water-spreading pans provided in the casing of the heater; and Fig. 3, a similar view of a sheet-metal water-spreading ring, a plurality of which may be provided in the casing.

A is the casing, formed, preferably, of sheet metal and by preference in two semicylindrical sections, each substantially like that presented in Fig. 1, to be adjusted together and fastened by circumferential hoops $a$ to form the complete casing and which may be nested one within the other for shipment. About the base portion is provided a series of air-inlet openings $b$, through which to supply air to a burner B, (shown of the common annular gas-burner type,) supported in the lower part of the casing, which is represented with an ornamental upwardly-tapering top A′, having a draft-chimney $b'$ for the escape of products of combustion. The supply of water to be heated is introduced by a pipe $c$, passing through the wall of the casing near its bottom to the center thereof, whence a branch pipe $c'$ rises vertically nearly to the upper edge of the casing, where it carries a tubular spraying-ring or annular head C, having an inner series of perforations $d$ and an outer series of perforations $d'$ in its under side.

In the casing and supported on the bracket $e$, which carries the heater and is to that end fastened to the wall of the casing, there fits an annular trough D, of sheet metal, from which there extends through the casing a draw-off spout or faucet $f$. On the inner wall of the trough D rests an annular upwardly-flaring pan E, provided with a flange $g$ about its upper edge and having the margin about the opening in its base corrugated or serrated, as shown at $h$. An annular downwardly-flaring sheet-metal pan F is serrated or corrugated, as shown at $i$, about its outer edge, where it rests on the pan E below it within the annular flange $g$ thereon, and near the outer edge of this pan F is provided a series of openings $k^2$, each provided with a cylindrical flange $h^3$, projecting upward from the top side of the pan. About the opening $l$ in the pan F is shown an upward-projecting flange $l'$.

On the lowermost pan F, about the flange $l'$, rests a pan E′ precisely like the pan E, except that the diameter of its annular opening $l$ is somewhat less and that it is provided near the edge of that opening with a series of openings $k$, having flanges $k'$ like the flanged openings in the lower pan F. A series of the pans F alternates with a series of the pans E′, reaching nearly to the plane of the spraying-head C in the casing, each pan resting on the one below it throughout the series, all the pans F being alike and all the pans E′ being alike, except that the diameter of the annular openings in them may decrease, as indicated, in the upward progress of the series to tend to check too free passage of the hot products of combustion from the burner. Projecting from between pairs of the pans F E′ are shown sheet-metal rings G G, curving downward toward the wall of the casing A and corrugated or serrated, as shown at $m$, about their outer flanged edges, at which they are shown to rest for support upon annular strengthening-beads $n$, formed in the casing. The uppermost pan E′ is shown to be rigidly fastened at its flange $g$ to the casing.

To use the heater, the burner B is ignited and the supply of water is let on, and the faucet $f$ should be opened for the discharge of the heated water. The hot products of combustion rise through the casing by way of the central openings in the stack of pans, the openings $k$ $k^2$ therein, and intersticial openings about their outer edges, thereby passing through practically every part of the space within the casing and thoroughly and quickly heating the casing and the pans and rings within it, and in their rise the hot products of combustion are encountered by the shower of water from the spraying-head C, from which the water falls upon the uppermost pan E', in which it spreads and flows about the flanges $k'$ through the openings $h$ upon the next succeeding pan F. On this pan the water spreads and discharges through its openings $i$ into the next lower pan E', and so on until it leaves the lowermost pan E at its openings $h$ to enter the trough D in a thoroughly-heated condition by its contact in a thinly-spread condition with the heat of the successive pans, which increases downwardly in the order of the pans, owing to their relation to the hot products of combustion rising from the heater. Water from the head C, which is sprayed from the outer series of perforations $d'$ against the inner surface of the casing, takes heat from the latter and from the rings G, which intercept and spread the water and discharge it in fine streams through the interstices at the outer edges of the rings, and this water also eventually reaches the trough in a highly-heated condition. From the trough the heated water is taken for use at the faucet $f$.

From the foregoing description of my improved construction it is readily apparent that the heater it affords thoroughly utilizes to the best advantage the heat of the products of combustion for heating the water, exposing to the heat a very large area of sheet-metal surface over which the water is obliged to course in thin sheets, that it is comparatively inexpensive to manufacture, that the parts may be readily put together for use and taken apart, and that the shell and the pans and rings within it may be nested for compactness in shipping the heater, all of which are objects of my improvement.

What I claim as new, and desire to secure by Letters Patent, is—

1. In an instantaneous water-heater, the combination with the casing containing a burner, of a water-supply pipe rising in the casing, a water-spraying head in the upper part of the casing and to which said pipe leads, and a stack of annular alternately upwardly and downwardly flaring pans rising in the casing about said pipe between the burner and head and resting one upon the other, and open at their bases to the flow of water between them, substantially as described.

2. In an instantaneous water-heater, the combination with the casing containing a burner, of a water-supply pipe rising in the casing, a water-spraying head in the upper part of the casing and to which said pipe leads, and a stack of annular alternately upwardly and downwardly flaring pans rising in the casing about said pipe between the burner and head and resting one upon the other and corrugated at their bases, substantially as described.

3. In an instantaneous water-heater, the combination with the casing containing a burner, of a water-supply pipe rising in the casing, a water-spraying head in the upper part of the casing and to which said pipe leads, and a stack of annular alternately upwardly and downwardly flaring pans rising in the casing about said pipe between the burner and head and resting one upon the other, said pans being corrugated at their bases and having flanged openings in their body portions for the passage through them of the products of combustion from the burner, substantially as described.

4. In an instantaneous water-heater, the combination with the casing containing a burner, of a water-supply pipe rising in the casing, a water-spraying head in the upper part of the casing and to which said pipe leads, an annular trough supported in the casing about the burner and having an outlet, and a stack of annular alternately upwardly and downwardly flaring pans supported in said trough to rise in the casing about said pipe, said pans resting one upon the other and being open at their bases to the flow of water between them into said trough, substantially as described.

5. In an instantaneous water-heater, the combination with the casing containing a burner, of a water-supply pipe rising in the casing, a water-spraying head in the upper part of the casing and to which said pipe leads, and a stack of annular alternately upwardly and downwardly flaring pans rising in the casing about said pipe between the burner and head and resting one upon the other, said pans being spaced from the casing and open at their bases to the flow of water between them, said head having outer openings for discharging water against the inner side of the casing and inner openings for discharging water upon said pans, substantially as described.

6. In an instantaneous water-heater, the combination with the casing containing a burner, of a water-supply pipe rising in the casing, a water-spraying head in the upper part of the casing and to which said pipe leads, an annular trough supported in the casing about the burner and having an outlet, a stack of annular alternately upwardly and downwardly flaring pans supported on the trough to rise in the casing about said pipe, said pans resting one upon the other and being open at their bases and spaced from the casing, and said head having outer openings for discharging water against the inner side of the casing and inner openings for discharging water upon said pans, and one or more water-spreading rings inclining downwardly toward the shell from between said pans, substantially as described.

7. In an instantaneous water-heater, the combination with the shell containing a burner near its base and in its upper portion a water-supplying head connected with a water-supply pipe, of a stack of annular alternately upwardly and downwardly flaring pans imposed one upon the other and rising in the shell between said burner and head, said pans being corrugated at their bases, and one or more circumferentially-corrugated water-spreading rings inclining downwardly toward the shell from between said pans, substantially as described.

8. In an instantaneous water-heater, the combination with the shell containing a burner near its base and in its upper portion a water-supplying head connected with a water-supply pipe, of a stack of annular alternately upwardly and downwardly flaring pans imposed one upon the other and rising in the shell between said burner and head, said pans being corrugated at their bases, and one or more water-spreading rings inclining downwardly toward the shell from between said pans, each ring having a circumferential corrugated flange, substantially as described.

9. In an instantaneous water-heater, the combination with the shell containing a burner near its base and in its upper portion a water-supplying head connected with a water-supply pipe, of a trough in the shell extending above the plane of the heater and having a discharge-spout leading from it, and a stack of annular flaring pans E, F, E' rising in the shell from said trough, said pans F, E' having flanged openings about their open centers, and the central openings in said pans decreasing in diameter upward through the stack, substantially as described.

MORRIS I. COHEN.

In presence of—
F. J. MARTIN,
M. J. FROST.